Oct. 22, 1968 H. J. KOZICKI 3,406,999
VEHICLE CAMPER GALLEY
Filed July 5, 1966 2 Sheets-Sheet 1
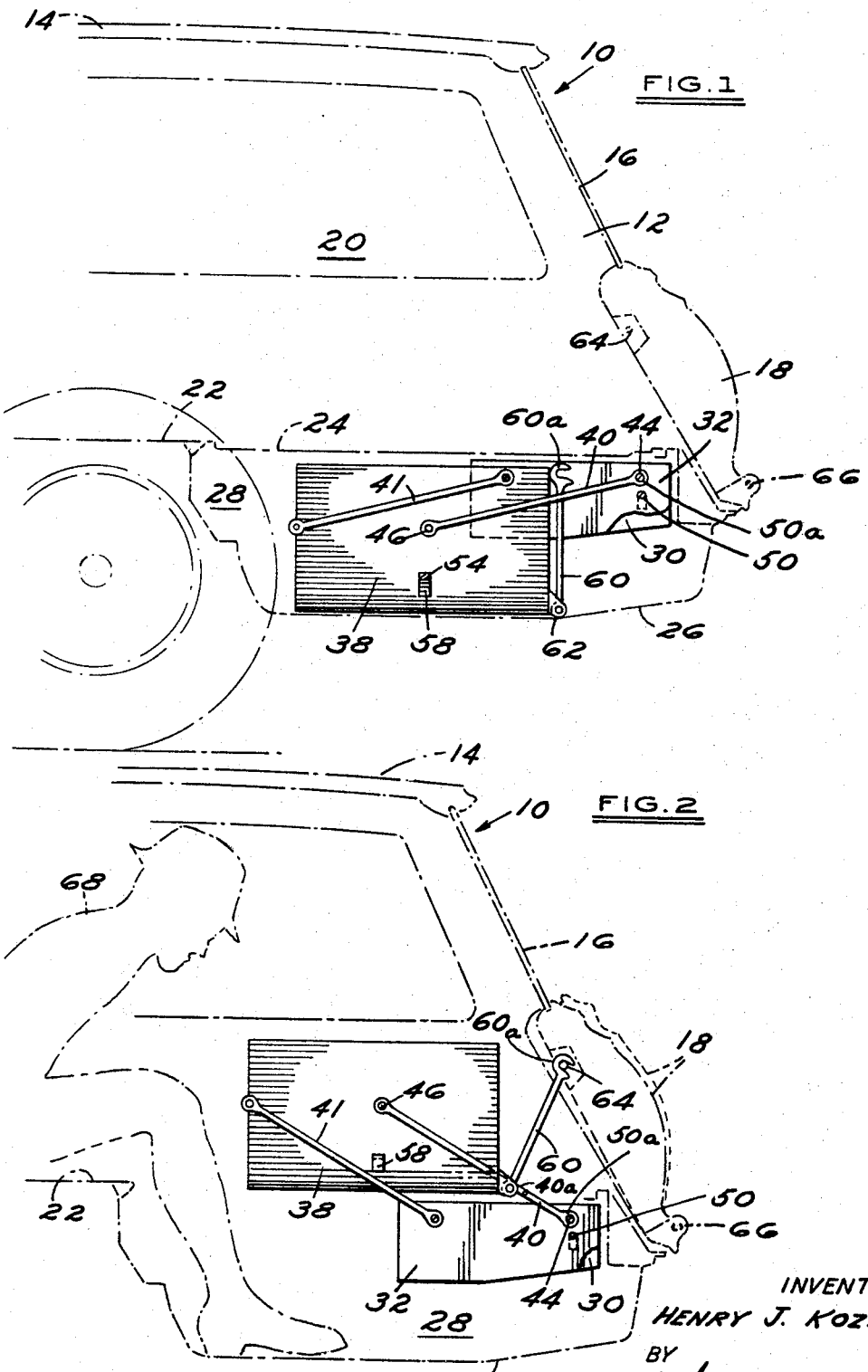
INVENTOR
HENRY J. KOZICKI
BY
John R. Faulkner
John J. Roethel
ATTORNEYS Oct. 22, 1968     H. J. KOZICKI     3,406,999
VEHICLE CAMPER GALLEY Filed July 5, 1966     2 Sheets-Sheet 2

INVENTOR
HENRY J. KOZICKI
BY
John R. Faulkner
John J. Roethel
ATTORNEYS

United States Patent Office 3,406,999
Patented Oct. 22, 1968

3,406,999
VEHICLE CAMPER GALLEY
Henry J. Kozicki, Birmingham, Mich., assignor to Ford Motor Company, Dearborn, Mich., a corporation of Delaware
Filed July 5, 1966, Ser. No. 562,594
12 Claims. (Cl. 296—23)

ABSTRACT OF THE DISCLOSURE

A camper galley for a motor vehicle of the station wagon type having a cargo supporting floor. The galley is stored in a well located beneath the floor and is swingable on linkage means out of the well. A latch secures the galley in the well against the forces exerted by torsion bars that urge the galley towards a position remote from the well.

---

This invention relates to a camper galley and in particular to a camper galley adapted to be mounted in the well of a motor vehicle having a station wagon body.

The large cargo space available in a station wagon has led many persons engaging in the sport of camping to select such a vehicle for camping purposes. A standard item of camping equipment is a galley used for food storage and cooking. There are present in the prior art various arrangements for mounting a camper galley in a station wagon cargo area such as mounting a galley on roller tracks so that it easily may be located near the tailgate for utilization.

Such arrangements have as a disadvantage the decrease in cargo space for another camping equipment attendant mounting the galley in the vehicle cargo area. This disadvantage is magnified if the mounting arrangement is of a permanent nature. Campers have thus found it convenient to store a camper galley in the station wagon well located beneath the floor of the cargo space. However, it is difficult and cumbersome to remove a galley from the vehicle well for use and subsequently to replace it in the well for storage.

This invention remedies such problems by providing a camper galley and attendant mounting apparatus that may easily be installed in a station wagon as an accessory thereto, and that permits galley storage in the vehicle well with convenient removal and replacement features.

It is, therefore, an object of this invention to provide a camper galley that may be conveniently stored in the well of a motor vehicle having a station wagon body.

A further object of this invention is the provision of a camper galley that may be conveniently moved from storage in a station wagon well to a plurality of positions inside and outside the station wagon cargo space.

A still further object of this invention is to provide a station wagon galley and attendant mounting apparatus of simple construction and reliability of operation that may be easily mounted in a station wagon as an accessory thereto.

Apparatus constructed in accordance with this invention includes opposed, spaced apart frame means that may be mounted on the opposing sides of a station wagon well. A camper galley is connected by pivotal means with said frame means so that it may be swung into and out of the station wagon well. Resilient means are operatively connected to said pivotal means and bias the camper galley towards a position remote from the space between said frame means. Latch means, having an operative position and an inoperative position, are mounted on said frame means and said camper galley and are adapted to hold the camper galley in the space between said frame means when said latch means are in the operative position, thus overcoming the force of said resilient means.

Further objects and advantages of this invention will become apparent when the following description is considered in conjunction with the accompanying drawings wherein the structural members of a station wagon body are shown schematically for purposes of clarity and where:

FIGURE 1 is a side elevation view of the rear portion of a station wagon body having camper galley apparatus mounted therein in accordance with this invention;

FIGURE 2 is a view similar to FIGURE 1 with the camper galley in the cook-inside position;

Figure 4:
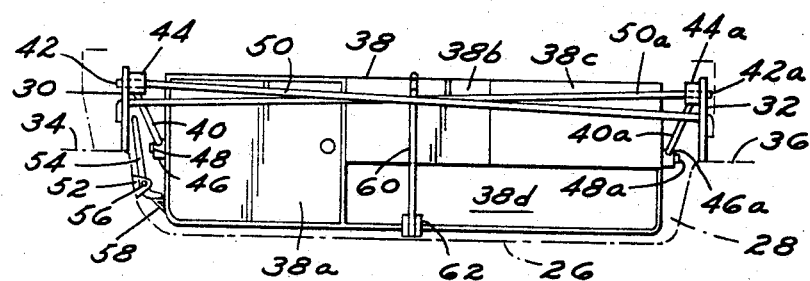
FIGURE 4 is a view taken from the rear of a station wagon well and showing the camper galley in the position illustrated in FIGURE 1.

Referring now in detail to the drawings and in particular to FIGURES 1 and 4, the numeral 10 denotes a motor vehicle having a station wagon body 12 including a roof 14, a rear window 16, a tailgate 18, and a cargo space floor 22. These structural members of the station wagon body define a cargo space 20. As is conventional in the station wagon art, a U-shaped member 26 defines a well 28. Access to well 28 from cargo space 20 is gained by removing a removable portion 24 of floor 22.

Plates 30 and 32 are mounted on well sides 34 and 36 respectively. These plates may be mounted permanently, as by welding, or removably, as by latches, in any suitable manner. A camper galley 38 rests on member 26 of well 28 and extends partially into the space between plates 30 and 32. As shown schematically in FIGURE 4, the camper galley 38 is divided into a cooler compartment 38a, a sink portion 38b, a cooking stove portion 38c and a storage compartment 38d.

An elongate arm 40, having enlarged end portions 44 and 46, pivotally interconnects plate 30 and camper galley 38. The pivotal connections are accomplished by means of pin 42, extending from plate 30, and pin 48 extending from camper galley 38, which pins extend into apertures formed in large end portions 44 and 46 of rod 40. Rod 40a, having enlarged end portions 44a and 46a is mounted on pins 42a and 48a in a manner similar to rod 40 but on the opposite side of camper galley 38.

A second pair of rods may be used to pivotally connect galley 38 and plates 30 and 32 to provide stability to galley 38 when it is moved from its storage position in well 28. Only one of these second pair of rods, designated by the numeral 41, is shown in the drawings.

Rod 41 is identical to rod 40 and is mounted in a like manner. Thus a four bar parellel linkage is provided that allows the attitude of the camper gallery 38 to remain constant as it swings through its path of movement to the various positions shown in the drawings. The movement of gallery 38 is thus curvilinear translation.

Camper galley 38 is biased towards the position shown in FIGURE 2 by means of torsion bars 50 and 50a. One end of torsion bar 50 is joined by welding or another suitable joining method to enlarged end 44 of arm 40. The other end of torsion bar 50 extends through an aperture in plate 32 and is suitably secured against rotation to plate 32 by welding or another joining method. Torsion bar 50a is mounted in a manner similar to torsion bar 50 to end 44a of arm 40a and plate 30.

A bracket 52 is joined to the left side 34 of well 28 and mounts an L-shaped latch arm 54 that is pivoted about point 56. The short arm of latch arm 54 cooperates with a shoulder 58 formed on camper galley 38 to hold camper galley 38 against the force of torsion bars 50 and 50a in the position shown in FIGURES 1 and 4. When latch arm 54 is rotated in a clockwise direction, it disengages shoulder 58 and allows the force of torsions bars 50 and 58 to raise camper galley 38 into the position shown in FIGURE 2.

Arm 60, having a hook 60a formed on one end thereof, is pivotally mounted on pin 62 near the center of the rear of camper galley 38. Hook 60a of arm 60 cooperates with a pin 64 located in a recess of tailgate 18 to position and lock against movement camper galley 38 as will be described in detail below.

The operation of the apparatus described above is as follows. Camper galley 38, when not in use, is stored in well 28 of the station wagon body 12 and is covered by removable portion 24 of floor 22. When utilization of camper galley 38 is desired, the removable portion 24 of floor 22 is removed from the position shown in FIGURE 1. Latch arm 54 is rotated clockwise out of engagement with shoulder 58 thus allowing the force of torsion bars 50 and 50a to move galley 38 into the position shown in FIGURES 1 and 4. Hooks 60a of arm 60 may then be engaged with pin 64 mounted on tailgate 18 to hold camper galley 38 in this position. This position may be termed the cook-inside position since so positioning galley 38 allows a camper 68 to sit conveniently on floor 22 of cargo space 20 and utilize camper galley 38 under the shelter of station wagon body 12 during inclement weather periods.

Figure 3:
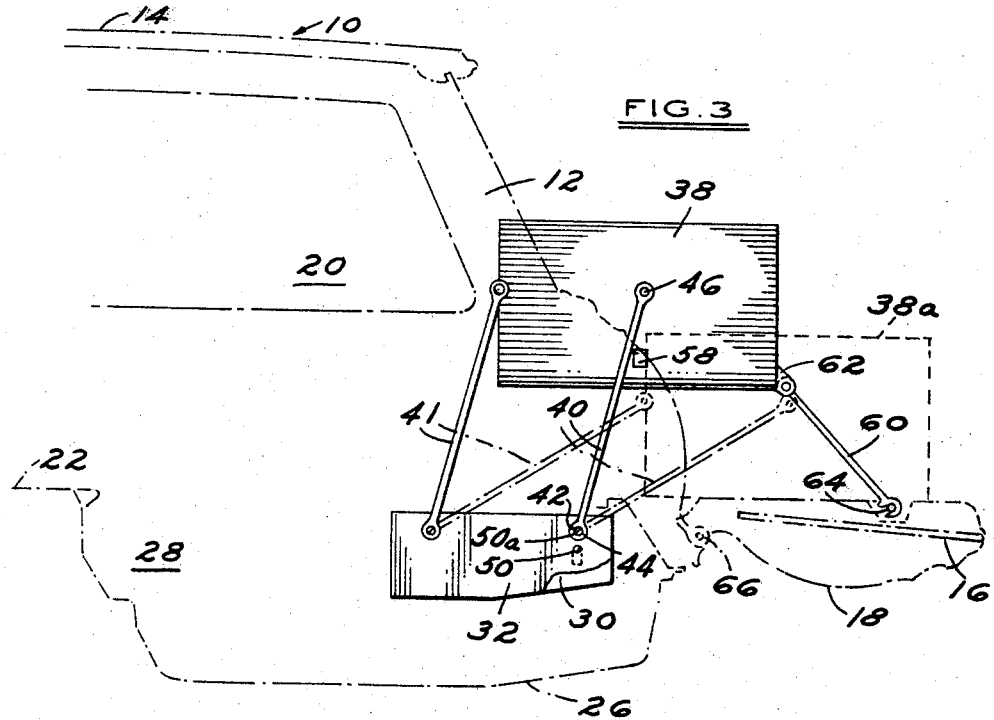
FIGURE 3 is a view similar to FIGURE 1 showing the camper galley in the cook-outside position.

Camper galley 38 may be moved to the cook-outside position shown in solid in FIGURE 3, the position for normal utilization, with little effort due to the cooperation of hook 60a and pin 64. This may be accomplished by lowering rear window 16 into tailgate 18 and opening tailgate 18 into the position shown in FIGURE 3 by swinging tailgate 18 about its pivot axis 66. As the tailgate 18 is lowered, camper galley 38, secured thereto by arm 60, is drawn into the cook-outside position. When camper galley 38 is in the cook-outside position the top surface of tailgate 18 serves as a convenient shelf.

Camper galley 38a may also be moved into a position shown in ghost at 38a in FIGURE 3 where it rests upon the top surface of open tailgate 18. It is there supported against movement that may occur due to the weight of cooking utensils or foods that may be carried by camper galley 38.

From the cook-outside position, camper galley 38a may be easily returned to its storage position. This is accomplished by first closing the tailgate 18. This will cause camper galley 38 to return to a cook-inside position as shown in FIGURE 2. The camper may then unhook arm 60 from pin 64 and push camper galley 38, against the force of torsion bar 50 and 50a, into well 28 so that camper galley 38 assumes the position shown in FIGURES 1 and 4. Once this position is attained, latch arm 54 is engaged with shoulder 58, thereby securing camper galley 38 in well 28. Removable portion 24 of floor 22 may then be replaced and the camper galley 38 conveniently stored in an unobtrusive position where it will not impede the normal use of cargo space 29.

It is to be understood that this invention is not limited to the exact construction shown and described above, but that various changes and modifications may be made without departing from the spirit and scope of the invention as defined by the following claims.

I claim:

1. In a motor vehicle, a station wagon body having a cargo supporting floor and a well disposed beneath said cargo floor, frame means mounted on the opposed sides of said well substantially parallel to the longitudinal axis of said vehicle, a container, and pivotal means interconnecting said frame means and said container for swinging said container out of and into said well below the level of said floor.

2. Apparatus according to claim 1, wherein said container is a camper galley.

3. Apparatus according to claim 1, wherein said pivotal means comprises a four bar parallel linkage for causing the swinging movement of said container to be curvilinear translation.

4. Apparatus according to claim 1, wherein said pivotal means includes a pair of arms, one end of each of said arms pivotally connected to said frame means, the other end of each of said arms pivotally connected to said container.

5. Apparatus according to claim 1, including resilient means operatively connected to said pivotal means and biasing said container towards a position exterior of said well.

6. Apparatus according to claim 5, including latch means having an operative position and an inoperative position mounted on said container and said frame means for overcoming the force of said resilient means and securing said container in said well when said latch means are in the operative position.

7. Apparatus according to claim 5, wherein said resilient means comprises a pair of torsion bars, each of said torsion bars interconnecting one of said arms with said frame means.

8. Apparatus according to claim 5, including a closure member for said cargo space mounted at the rear of said station wagon body and having a closed position and an open position, said closure member pivotally mounted about a substantially horizontal axis lying substantially perpendicular to the longitudinal axis of said vehicle, latch means mounted on and interconnecting said container and said closure member and having an operative position and an inoperative position, said latch means securing said container to said closure member for swinging said container to a position remote from said well when said closure member is moved from the closed position to the open position and said latch means are in the operative position.

9. In a motor vehicle, a station wagon body defining a cargo space and a well disposed beneath said cargo space, frame means mounted on opposed sides of said well, a camper galley normally located in said well, a pair of arms, one end of each of said arms pivotally connected to said galley and the other end of each of said arms pivotally connected to said frame means, resilient means operatively connected to said arms and biasing said galley towards a position exterior of said well, and latch means having an operative position and an inoperative position for overcoming the force of said resilient means and securing said galley in said well when said latch means are in the operative position.

10. Camping apparatus comprising opposed spaced apart frame means, a camper galley, a pair of arms, one end of each of said arms pivotally connected to said frame means and the other end of each of said arms pivotally connected to said galley, and a pair of torsion bars, each of said torsion bars interconnecting one of said arms with said frame means and exerting a force biasing said camper galley toward a position remote from the space between said frame means.

11. Apparatus according to claim 10, including latch means having an operative position and an inoperative position and mounted on said galley and said frame means for overcoming the forces exerted by said torsion bars and securing said galley between said frame means when said latch means are in the operative position.

12. Apparatus according to claim 10, wherein said pivotal means further includes a second pair of arms, each one of said second pair of arms interconnecting said frame means and said container.

References Cited
UNITED STATES PATENTS

| | | | |
|---|---|---|---|
| 2,867,471 | 1/1959 | Coon | 296—23 |
| 2,009,051 | 7/1935 | King | 296—37 |
| 3,181,911 | 5/1965 | Peras | 296—37 |
| 3,224,827 | 12/1965 | Foster | 312—266 |
| 2,439,494 | 4/1948 | Stone | 312—266 |
| 290,168 | 12/1883 | Basford | 312—266 |

PHILIP GOODMAN, *Primary Examiner.*